US006195069B1

(12) United States Patent
Rhoads

(10) Patent No.: US 6,195,069 B1
(45) Date of Patent: Feb. 27, 2001

(54) METHOD AND APPARATUS FOR 3-DIMENSIONAL MOTION PICTURE DISPLAY

(75) Inventor: Geoffrey B. Rhoads, Portland, OR (US)

(73) Assignee: Pinecone Imaging Corporation, West Linn, OR (US)

( * ) Notice: Subject to any disclaimer, the term of this patent is extended or adjusted under 35 U.S.C. 154(b) by 0 days.

(21) Appl. No.: 08/154,864

(22) Filed: Nov. 18, 1993

(51) Int. Cl.[7] ................................................ G09G 5/00
(52) U.S. Cl. .................... 345/6; 348/51; 348/54
(58) Field of Search .................... 345/6, 31, 139; 348/51, 54; 359/17, 22, 23, 222

(56) References Cited

U.S. PATENT DOCUMENTS

| 3,335,217 | * | 8/1967 | Bassett | 348/51 |
| 4,130,832 | * | 12/1978 | Sher | 345/6 |
| 4,573,046 | * | 2/1986 | Pinnow | 340/825.56 |
| 4,692,878 | * | 9/1987 | Ciongoli | 345/6 X |
| 4,871,231 | * | 10/1989 | Garcia | 348/51 X |
| 5,061,049 | * | 10/1991 | Hornbeck | 359/222 |
| 5,091,719 | * | 2/1992 | Beamon, III | 348/51 |
| 5,111,313 | * | 5/1992 | Shires | 359/17 |

FOREIGN PATENT DOCUMENTS

WO93/02372    2/1993   (WO) .

OTHER PUBLICATIONS

Tom Williams, "Vibrating Mirror Creates 'True' 3–D Images", Electronic Design, vol. 29, No. 18, Sep. 3, 1981, p. 44.*

* cited by examiner

Primary Examiner—Kent Chang
(74) Attorney, Agent, or Firm—William Y. Conwell

(57) ABSTRACT

A 3-dimensional motion picture display is achieved by raster scanning a beam of collimated light from each of a plurality of light sources into a viewing space. The system is essentially a time based ray tracer, and can thus simulate objects both behind, on, and in front of the physical locations of the light emanating from the sources.

4 Claims, 1 Drawing Sheet

METHOD AND APPARATUS FOR 3-DIMENSIONAL MOTION PICTURE DISPLAY

FIELD OF THE INVENTION

The present invention relates to 3-dimensional display systems, and more particularly relates to 3-dimensional display systems which do not require viewer-worn optical elements.

BACKGROUND AND SUMMARY OF THE INVENTION

Many methods have been proposed for displaying visual scenes in a realistic 3-dimensional form. Early forms of this art involve the wearing of glasses with a different color filter for each eye, or glasses with orthogonal polarizations for each eye. In both cases, the projection systems encoded two separate views accordingly, to be viewed separately by the individual eyes of a viewer.

Holography has been used in the 3-dimensional display of information, although applying these principles to moving pictures has proven difficult.

In accordance with the preferred embodiment of the present invention, a 3-dimensional motion picture display is achieved without special glasses on the viewers, and without reliance on holographic methods. Further, it actually displays a large multitude of scene angles, not just two, thereby giving full 3-dimensional effects as one moves around in the viewing space. The device generally projects this three dimensional image from a two dimensional screen.

The foregoing and additional features and advantages of the present invention will be more readily apparent from the following detailed description thereof, which proceeds with reference to the accompanying drawings.

DETAILED DESCRIPTION

Figure 1:
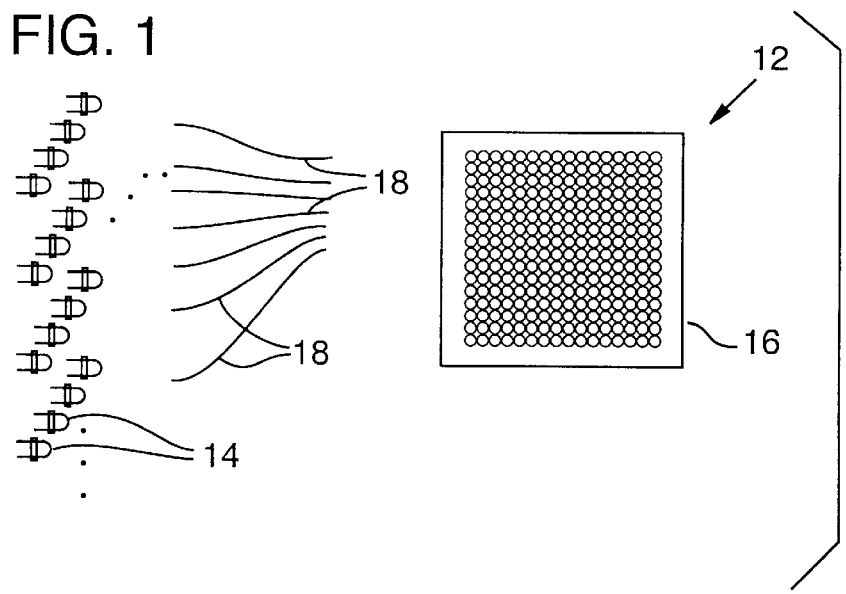
FIG. 1 is a schematic portrayal showing certain aspects of one embodiment of the invention.
Figure 2:
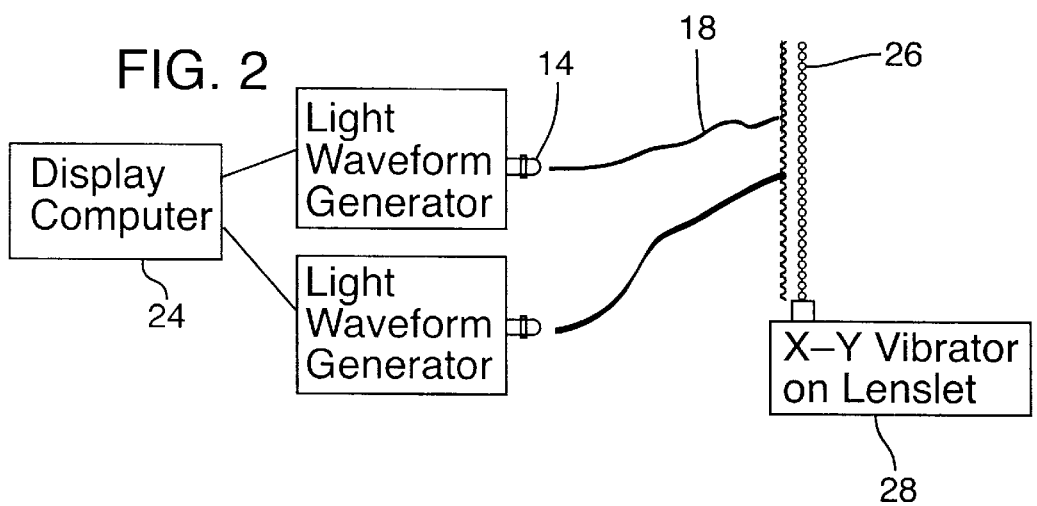
FIG. 2 is a block diagram of the embodiment of FIG. 1.
Figure 3:
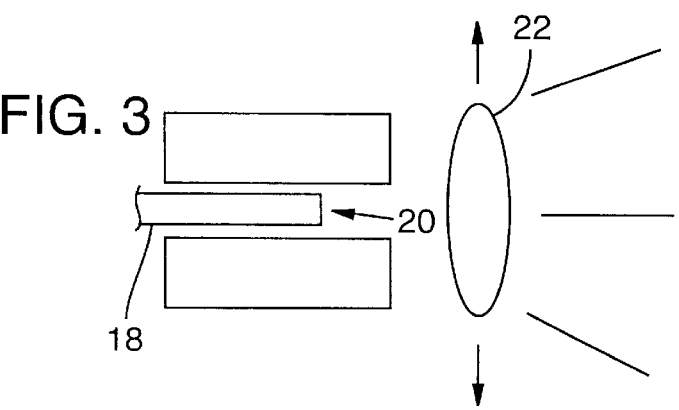
FIG. 3 is a diagram showing the termination of an optical fiber behind a mechanically vibrated steering lens.

In accordance with the illustrated embodiment of the present invention, a display device 14 is constructed using a two dimensional array of display elements, or pixels 14, just as with known image display devices. In this case, however, each pixel projects its own unique rasterized and collimated beam out into the viewing space, while modulating its brightness signal in accordance with the instantaneous direction it is pointing. It is as if each pixel were a search light that is raster scanned into a viewing space while its light output is modulated. To avoid flicker, the raster scanning of viewer space requires, generally, a 30 hertz repeat cycle. Typically, all pixels rasterize in unison, although in certain embodiments it may be desirable to employ non-unison rasterization. Three dimensional images are simulated by modulating the light signal emanating from each search-light pixel accordingly.

The time bandwidth on the light signal, and the spatial beam width of the projected light beams, largely determine the fineness and discrimination of depth perception, while the number and spacing of pixels still generally determine the apparent sharpness of images. In this way, the display device is essentially a time based ray tracer and can thus simulate objects both behind, on, and in front of the physical locations of the light emanations from the pixels (i.e. the display surface plane 16).

An illustrative implementation is shown in the Figures. Included is an array of 900 LEDs 12 (in a 30×30 array), each coupled to an optical fiber 18 whose distal end 20 terminates adjacent a collimating/steering lenslet 22. In the illustrated embodiment, the lenslets are disposed on a unitary structure 26 which is moved in the X- and Y-directions in accordance with raster scanning signals provided to an appropriate positioning system 28. Positioning systems suitable for this purpose are available from General Scanning Inc., of Watertown, Mass, or can be implemented using speaker voice coils or the like. By keeping the fiber ends 20 stationary while the unitary array of lenslets 22 moves, 900 discrete beams are projected from the fiber ends and are synchronously raster scanned across the viewing space.

In the illustrated embodiment, the raster scan of the viewing space by each search-light pixel consists of 20 horizontal lines. During the period of a single horizontal line, the intensity of the search-light pixel changes up to twenty times. Still assuming 30 complete raster scans per second, each LED is thus modulated at a data rate of 12 KHz, and the positioning system sweeps the unitary lenslet array at a vertical frequency of 30 Hz and a horizontal frequency of 600 Hz.

Even in this rudimentary example, it can be seen that the nominal data rate is substantial (900 LEDs×12 KHz each= 1.08 Mhz data). Processors optimized for three dimensional graphics processing, such as those available from Silicon Graphics and others, are believed best suited for use as the driving display computer 24. It is believed the processing burden may be reduced by techniques known in the 3-D imaging/simulation art; however, such optimizations have not yet been investigated.

Having described and illustrated the principles of my invention with reference to a preferred embodiment thereof, it should be apparent that the invention can be modified in arrangement and detail without departing from such principles. For example, while the invention has been illustrated with reference to a system that displays motion pictures, it should be apparent that the same principles can be employed in systems that display fixed images. Similarly, while the invention has been described with reference to an embodiment using an X-Y positioner to effect raster scanning by movement of a lenslet array, it will be apparent that the same search-light scanning effect can be achieved by other arrangements. One is to pass the light exiting the optical fibers through a stationary optical element that controllably refracts the light in desired directions in accordance with signals provided thereto. Some crystals, for example, can change the direction of light in response to stresses applied thereto. Yet another option is to steer the light using an array of electronically steered micro-mirrors, as have recently been publicized by Texas Instruments.

While not particularly detailed herein, it is known to grind the ends of optical fibers into microlenses and other shapes to aid in coupling of light into and out of the fiber. By shaping the distal ends 20 of the illustrated fibers with microlenses, the optical refraction required to effect steerable collimation can be distributed among three lens surfaces, rather than just the two available on a lenslet 22, with an additional degree of design flexibility thereby afforded. In a similar vein, the steering optical element associated with a fiber end may not be just a single lens, as in the embodiment illustrated, but can be implemented by two or more optical elements in cooperation. In embodiments using two or more optical elements to effect steering, it may be preferred to move only one of the elements and maintain the other(s) stationary.

In the illustrated example, the lenslet array defines a planar display surface 16. In some applications, however, a curved display surface may be preferred.

It should be understood that the illustrated use of LEDs is exemplary only. Any display element that can be modulated at the desired rates, be it LCD, gas plasma, phosphor, laser, or other technology not available at the time of this writing, can alternatively be used. If the display element provides collimated light, then the associated optics can implement a pure steering, rather than steering/collimating, function.

In view of the wide variety of embodiments to which the principles of the present invention can be put, it should be understood that the foregoing description is illustrative only and should not be taken as limiting the scope of my invention. Rather, I claim as my invention all such embodiments as fall within the scope and spirit of the following claims, and equivalents thereto.

I claim:

1. A projection method including:
producing a 2-dimensional array of collimated light beams;
changing, with time, the direction each light beam is pointing so as to illuminate a viewing space; and
individually modulating each light beam in accordance with the instantaneous direction it is pointing;
wherein viewers at different positions in the viewing space perceive differing, location-dependent views of the 3-dimensional image.

2. The method of claim 1 in which the steering includes raster scanning each light beam.

3. The method of claim 1 which includes modulating each light beam in accordance with image data corresponding to a static image.

4. The method of claim 1 which includes modulating each light beam in accordance with image data corresponding to a moving picture.

* * * * *